United States Patent
Gedik et al.

(10) Patent No.: US 9,063,788 B2
(45) Date of Patent: Jun. 23, 2015

(54) STREAM PROCESSING WITH RUNTIME ADAPTATION

(75) Inventors: Bugra Gedik, Ankara (TR); Gabriela Jacques da Silva, White Plains, NY (US); Vibhore Kumar, Hawthorne, NY (US); Rohit Wagle, Elmsford, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/594,961

(22) Filed: Aug. 27, 2012

(65) Prior Publication Data

US 2014/0059210 A1     Feb. 27, 2014

(51) Int. Cl.
*G06F 15/16* (2006.01)
*G06F 9/50* (2006.01)
*H04L 12/26* (2006.01)
*G06F 17/30* (2006.01)

(52) U.S. Cl.
CPC ............. *G06F 9/5066* (2013.01); *H04L 43/08* (2013.01); *G06F 17/30516* (2013.01)

(58) Field of Classification Search
CPC . H04L 12/2634; H04L 41/0816; H04L 43/08; G06F 9/5066
USPC ........................................................ 709/224
See application file for complete search history.

(56) References Cited

U.S. PATENT DOCUMENTS

| | | | |
|---|---|---|---|
| 5,600,808 A * | 2/1997 | Kasukawa | 718/102 |
| 7,730,364 B2 * | 6/2010 | Chang et al. | 714/47.2 |
| 8,055,935 B2 * | 11/2011 | Chafle et al. | 714/4.21 |
| 8,171,348 B2 * | 5/2012 | O'Sullivan et al. | 714/47.1 |
| 8,291,061 B2 * | 10/2012 | Casati et al. | 709/224 |
| 8,656,396 B2 * | 2/2014 | Andrade et al. | 718/102 |
| 2014/0059210 A1 * | 2/2014 | Gedik et al. | 709/224 |
| 2014/0059212 A1 * | 2/2014 | Gedik et al. | 709/224 |

OTHER PUBLICATIONS

Jacques-Silva, et al., "Building User-defined Runtime Adaptation Routines for Stream Processing Applications," Proceedings of the VLDB Endowment, vol. 5, No. 12, Aug. 27-31, 2012; pp. 1826-1837.

* cited by examiner

*Primary Examiner* — Lance L Barry
(74) *Attorney, Agent, or Firm* — Cantor Colburn LLP (57) ABSTRACT

Embodiments of the disclosure include a system for providing stream processing with runtime adaptation, having a stream processing application that receives an incoming data stream and a runtime infrastructure configured to execute the stream processing application. The system also includes an orchestrator configured to communicate with the runtime infrastructure and the stream processing application, the orchestrator configured to perform a method. The method includes registering one or more events, wherein each of the events is associated with a stream processing application. The method also includes monitoring, by a processor, for an occurrence of the one or more events associated with the stream processing application, wherein each of the one or more events is associated with one or more runtime metrics. The method further includes receiving an event notification, wherein the event notification includes event identification and an event context and executing an adaptation of the stream processing application.

17 Claims, 6 Drawing Sheets

```
01: void MyOrca::handleOrcaStart(
02:   const OrcaStartContext & context)
03: {
04:   OperatorMetricScope oms("opMetricScope");
05:   oms.addCompositeTypeFilter("composite1");
06:   oms.addOperatorTypeFilter({"Split", "Merge"});
07:   oms.addOperatorMetric(
08:     OperatorMetricScope::queueSize);
09:
10:   PEFailureScope pfs("failureScope");
11:   pfs.addApplicationFilter("Figure2");
12:
13:   _orca->registerEventScope(oms);
14:   _orca->registerEventScope(pfs);
15:
16:   // other operations here
17: }
```

STREAM PROCESSING WITH RUNTIME ADAPTATION

BACKGROUND

The present disclosure relates to stream processing, and more specifically, to methods and systems of stream processing including runtime adaptations.

Stream processing applications perform a sequence of transformations on data streams and are composed as data flow graphs, where each vertex of the graph is an operator instance and each edge is a stream connection. In general, stream processing applications execute data transformations upon the arrival of a stream of data items, referred to as a tuples, and sends the newly computed data item to an output stream. In order to achieve high-performance and scalability, the stream processing application can be executed in a distributed fashion over a set of hosts.

Typically, streaming applications are deployed by submitting the composed data flow graph to a target stream processing infrastructure, which continuously runs the application until it is explicitly cancelled. In general, multiple applications can be submitted to the infrastructure at different times. These applications can connect to each other at runtime to form time-evolving solutions.

Streaming applications often need to be adapted to changes in runtime conditions. For instance, when the application is overloaded due to a transient high input data rate, it may need to temporarily apply load shedding policies to maintain a guaranteed quality of service, or response time. However, stream processing languages that are used for developing stream processing applications do not provide constructs for runtime adaptation. This is because these languages are generally declarative. As a result, developers focus on expressing data processing logic, but not adapting to changes in runtime conditions.

SUMMARY

According to an exemplary embodiment, a computer program product for providing stream processing with runtime adaptation, the computer program product includes a tangible storage medium readable by a processing circuit and storing instructions for execution by the processing circuit for performing a method. The method includes registering one or more events, wherein each of the events is associated with a stream processing application. The method also includes monitoring, by a processor, for an occurrence of the one or more events associated with the stream processing application, wherein each of the one or more events is associated with one or more runtime metrics. The method further includes receiving an event notification, wherein the event notification includes event identification and an event context and executing an adaptation of the stream processing application.

According to another exemplary embodiment, a system for providing stream processing with runtime adaptation, includes a stream processing application that receives an incoming data stream and a runtime infrastructure configured to execute the stream processing application. The system also includes an orchestrator configured to communicate with the runtime infrastructure and the stream processing application, the orchestrator configured to perform a method. The method includes registering one or more events, wherein each of the events is associated with a stream processing application. The method also includes monitoring, by a processor, for an occurrence of the one or more events associated with the stream processing application, wherein each of the one or more events is associated with one or more runtime metrics. The method further includes receiving an event notification, wherein the event notification includes event identification and an event context and executing an adaptation of the stream processing application.

Additional features and advantages are realized through the techniques of the present disclosure. Other embodiments and aspects of the disclosure are described in detail herein and are considered a part of the claimed invention. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
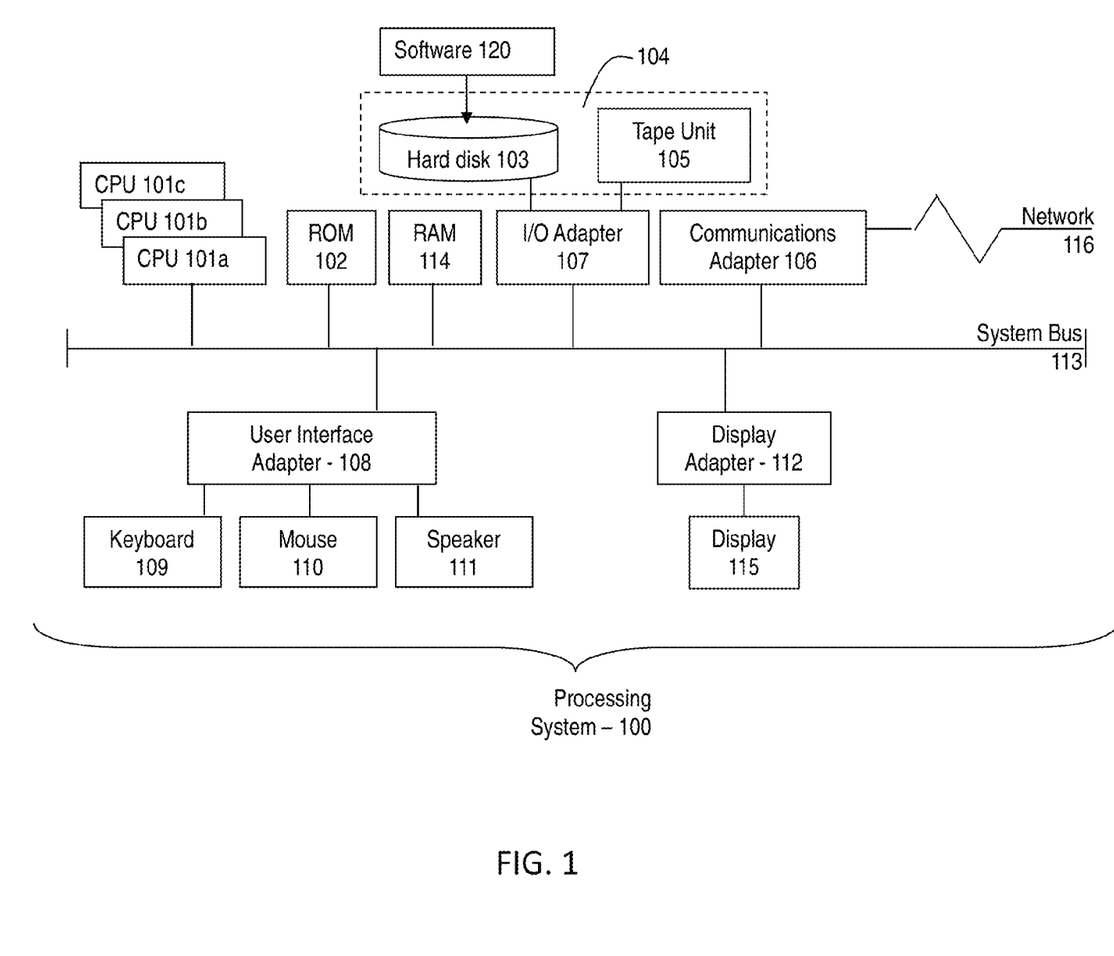
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, a direct access storage device or hard disk 103, and tape storage device 105 are collectively referred to herein as mass storage 104. A network adapter 106 interconnects bus 113 with an outside network 116 enabling data processing system 100 to communicate with other such systems and external storage devices. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the z/OS® operating system from IBM Corporation to coordinate the functions of the various components shown in FIG. 1.

Examples of operating systems that may be supported by the system 100 include Windows 95, Windows 98, Windows NT 4.0, Windows XP, Windows 2000, Windows CE, Windows Vista, Macintosh, LINUX, and UNIX, z/OS or any other suitable operating system. The system 100 also includes a network interface 116 for communicating over a network. The network can be a local-area network (LAN), a metro-area network (MAN), or wide-area network (WAN), such as the Internet or World Wide Web. Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11a, 802.11b, 802.11g).

As disclosed herein, the system 100 includes machine readable instructions stored on machine readable media (for example, the hard disk 103) for capture and interactive display of information shown on the screen 115 of a user. As discussed herein, the instructions are referred to as "software" 120. The software 120 may be produced using software development tools as are known in the art. Also discussed herein, the software 120 may also referred to as a "command line testing tool" 120, an "a testing interface" 120 or by other similar terms. The software 120 may include various tools and features for providing user interaction capabilities as are known in the art. The software 120 can include a database management subsystem such as DB2®, which manages structured data access requests and queries from end users and applications.

In exemplary embodiments, a stream processing language can be used to create stream processing applications. One example of a stream processing language is IBM Streams Processing Language (SPL). SPL allows the composition of streaming applications by assembling operators and expressing stream interconnections. In SPL, operators can implement any logical function (e.g., filtering, aggregation, image processing) and be arbitrarily interconnected. To execute a streaming application, an SPL compiler places operators into processing elements (PEs), which are runtime containers for one or more operators. During execution, each PE maps to an operating system process, which can execute on any host available in a runtime infrastructure. The compiler may partition operators into PEs based on performance measurements and following partition constraints informed by the application developer via annotations. During runtime, PEs may be distributed over hosts according to host placement constraints informed by developers as well as the resource availability of hosts and load balancing requirements.

In exemplary embodiments, SPL may specify one or more runtime metrics for the streaming application. In exemplary embodiments, the runtime metrics are counters updated during execution of the streaming application and can be read externally by users to inspect runtime statistics. The runtime metrics may include both built-in and custom metrics. In exemplary embodiments, built-in metrics are counters that maintain information that is common to all operators and PEs in the system. For example, the number of tuples processed per operator, the number of tuples sent by an operator, or the number of tuple bytes processed by a PE. In exemplary embodiments, custom metrics are counters that maintain information that relates to a specific operator type available in SPL. For example, a filter operator may maintain the number of tuples it discards. In exemplary embodiments, custom metrics may be created at any point, including during the execution of the streaming application.

Streaming applications may have distinct logical and physical representations because a single streaming application, which can be represented by a stream processing graph, can be separated into different operating system processes and run on a distributed set of hosts. As a result, adaptation policies need to be able to understand and influence the physical representation of the stream processing graph. Accordingly, in exemplary embodiments a mapping between the logical and the physical representation is available to the developers via the orchestrator.

Figure 2:
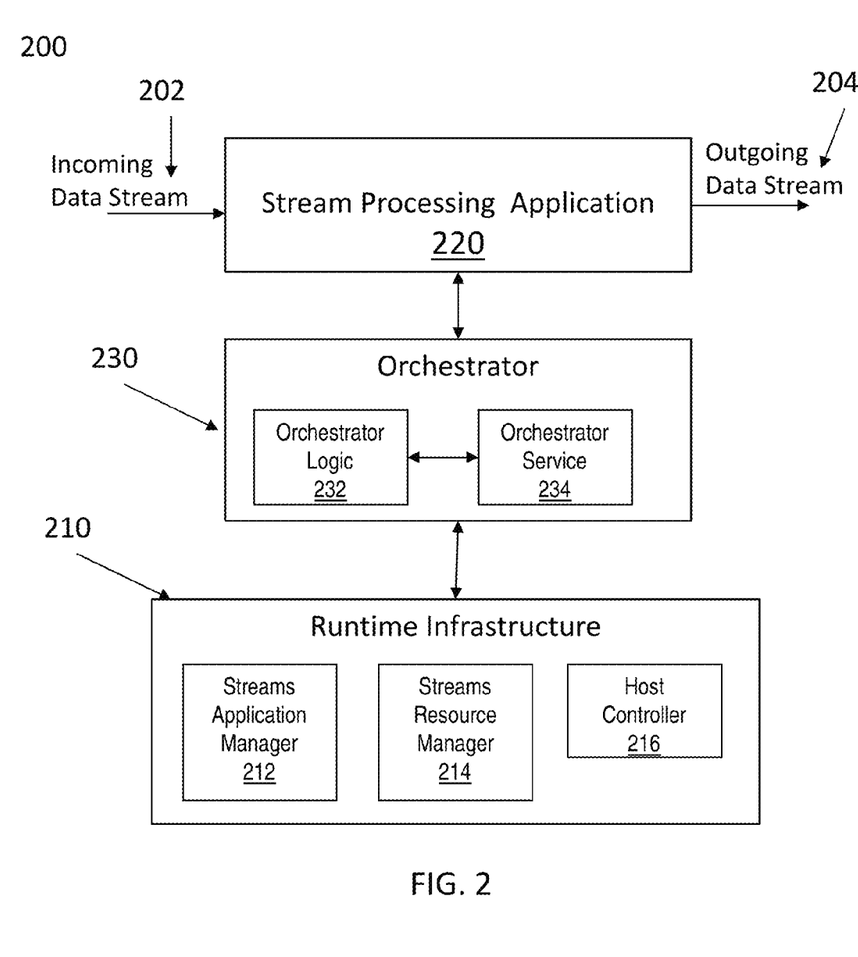
FIG. 2 is a block diagram illustrating a system for stream processing with runtime adaptation in accordance with an exemplary embodiment.

Referring now to FIG. 2, a block diagram of a system 200 for stream processing with runtime adaption in accordance with an exemplary embodiment is shown. As illustrated, the system 200 includes a runtime infrastructure 210, a stream processing application 220, and an orchestrator 230. In exemplary embodiments, the orchestrator 230 is configured to communicate with the runtime infrastructure 210 and the stream processing application 220. The stream processing application 220 receives incoming data streams 202 and may produce outgoing data streams 204. The orchestrator 230 allows developers of stream processing application 220 to register events of interest and specify handlers that will be executed upon the occurrence of these events. By running an orchestrator 230 together with the stream processing application 220, developers can effectively make the stream processing applications 220 follow a specific management policy. In addition, the orchestrator 230 provides a uniform way to implement event detection and actuation policies for stream processing applications 220.

In exemplary embodiments, the runtime infrastructure 210 includes a Streams Application Manager (SAM) 212, a Streams Resource Manager (SRM) 214, and a Host Controller (HC) 216. The SAM 212 receives application submission and cancellation requests. Each application submitted to SAM 212 is considered a new job in the stream processing system 200. When starting a job, SAM 212 assigns all the PEs associated with that application according to their placement constraints. SAM 212 can also stop and restart PEs running in the system. In exemplary embodiments, the SRM 214 is responsible for maintaining information regarding which hosts are available to the for application deployment. It also maintains status information about which system components (e.g., SAM) and PEs are up and running. The SRM 214 is responsible for detecting and notifying the occurrence of process or host failures. In exemplary embodiments, SRM 214 also serves as a collector for all runtime metrics maintained by the system, such as the built-in and custom metrics of all streaming applications under execution. In exemplary embodiments, the HC 216 resides in each host of the system that can run streaming applications. The HC 216 does local operations on behalf of the central components of the system, such as starting local processes for running PEs and maintaining process status information. The HC 216 also collects metrics from PEs running locally and periodically sends them to SRM 214.

In exemplary embodiments, the orchestrator 230 includes orchestrator logic 232 and an orchestrator service 234. The orchestrator logic 232 includes the application-specific control code and can be used to start and control one or more streaming applications. The orchestrator service 234 provides the orchestrator logic 232 a set of interfaces for event handling and an API to help the implementation of actuation routines. The orchestrator logic 232 registers runtime events of interest and specifies handlers that will be executed upon the delivery of these events. The orchestrator service 234 is a runtime component that detects changes and delivers relevant events to the orchestrator logic 232. The orchestrator logic 232 can further use the orchestrator service 234 to inspect the meta-data associated with the running application components to carry on specific tasks.

In exemplary embodiments, the orchestrator logic 232 can invoke routines from the orchestrator service 234 by using a reference received during construction. In exemplary embodiments, the orchestrator logic 232 can only receive events and act on streaming applications that were started through the orchestrator service 234. If the orchestrator logic 232 attempts to act on jobs that it did not start, the orchestrator service 234 reports a runtime error. In exemplary embodiment, the components of the runtime infrastructure 210 (e.g., SAM 212 and SRM 214) are aware of an orchestrator 230 as a manageable entity. For example, the SAM 212 may keep track of all orchestrators 230 running in the system 200 and their associated streaming applications 220.

Figure 3:
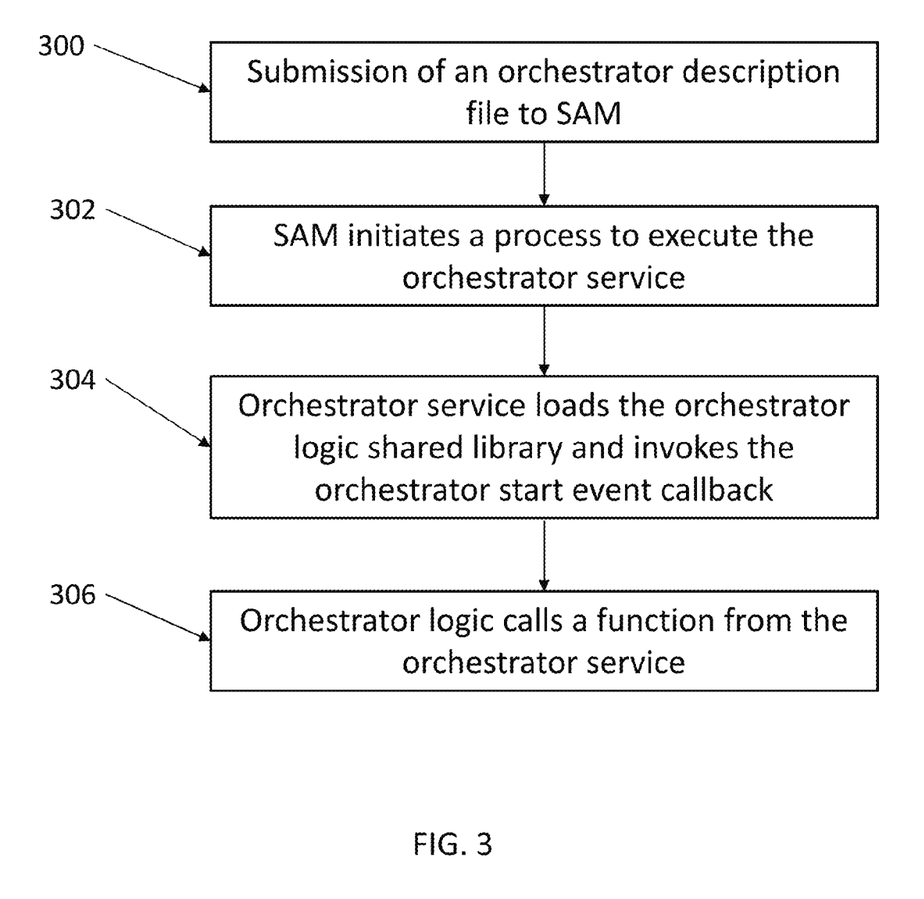
FIG. 3 is a flow diagram that illustrates a method for configuring an orchestrator that provides runtime adaptation during stream processing in accordance with an exemplary embodiment.

Referring now to FIG. 3 a flow diagram of a method for configuring an orchestrator that provides runtime adaptation during stream processing in accordance with an exemplary embodiment is shown. As shown at block 300, the method begins with the submission of an orchestrator description file to SAM. Next, as shown at block 302, the SAM then initiates a process to execute the orchestrator service. In exemplary embodiments, the orchestrator service is executed as a new process to ensure memory isolation between user-written code and infrastructure components. As illustrated at block 304, the orchestrator service loads the orchestrator logic shared library and invokes an orchestrator start event callback. Next, as shown at block 306, the orchestrator logic calls a function from the orchestrator service. As a result, the orchestrator service can issue and receive calls to/from infrastructure components, such as SAM, SRM, and operators belonging to a managed streaming application.

In exemplary embodiments, the orchestrator service may interact with external components to generate events to the orchestrator logic. For example, the orchestrator service can generate component failure events once SAM pushes a failure notification. In exemplary embodiments, the generation of such an event does not add a performance penalty to the streaming applications, since existing failure detection mechanisms already available are being re-used. The handling of such an event by the orchestrator, however, can increase the recovery time of the streaming application, since the failure reaction is delayed by one extra remote procedure call (from SAM to orchestrator service) plus the time consumed by the user-specific failure handling routine. In exemplary embodiments, the orchestrator service generates runtime metric events by pulling such data from SRM at a specified rate. In addition, PEs may be configured to deliver updated runtime metrics to SRM at fixed rates independent of orchestrator calls. The orchestrator service can also receive user-generated events via a command tool, which generates a direct call to the orchestrator service.

Figure 4:
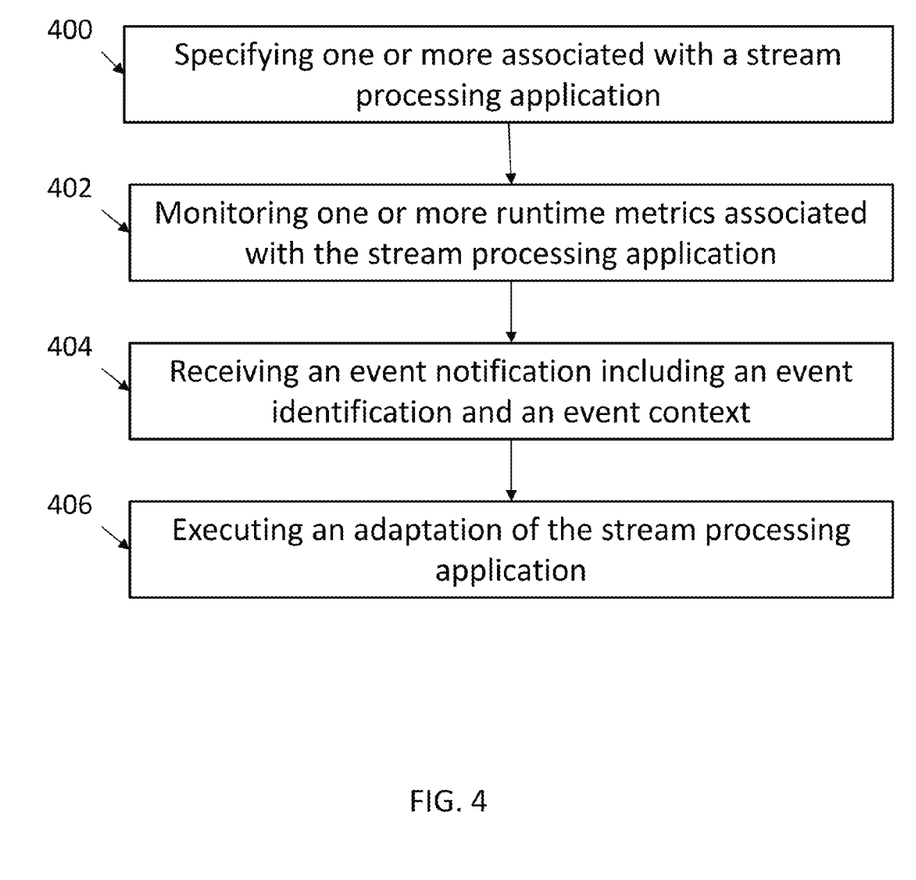
FIG. 4 is a flow diagram that illustrates a method for stream processing with runtime adaptation in accordance with an exemplary embodiment.

Referring now to FIG. 4 a flow diagram of a method for stream processing with runtime adaptation in accordance with an exemplary embodiment is shown. As shown at block 400, the method includes specifying one or more events, wherein each of the events is associated with a stream processing application. Next, as shown at block 402, the method includes monitoring one or more runtime metrics associated with the stream processing application. The method also includes receiving an event notification, as shown at block 404. In exemplary embodiments, the event notification includes event identification and an event context. Based on receiving the event notification, the method includes executing an adaptation of the stream processing application, as shown at block 406.

In exemplary embodiments, the event notification may include the current value of a streaming application runtime metric. The orchestrator logic can use such value to evaluate if a runtime metric is exceeding a threshold value. For example, this evaluation may indicate that a processing element has exceeded a desired maximum workload. Accordingly, the adaptation of the stream processing application may include reassigning one or more of the processing elements to a different host. In exemplary embodiments, the adaptation of the stream processing application may include changing a sampling rate of the stream processing application.

In exemplary embodiments, a developer may use the orchestrator to create and implement a management policy for a streaming application. The management policy may specify events of interest and how the application should adapt upon the occurrence of these events. The management policy can be specified in the orchestrator logic by using APIs provided by the orchestrator service (e.g., actuation methods that are applicable to all streaming applications). In exemplary embodiments, the orchestrator service can deliver two different sets of events to the orchestrator logic. The first set has events generated by the orchestrator service itself. For example, a start signal, job submission, job cancellation, and timer expiration. The second set of events requires the orchestrator service to interact with external middleware runtime components. These include events related to runtime metrics, failure events, and user-defined events.

To simplify the development of the orchestrator logic and reduce the number of notifications received during runtime, developers can specify an event scope of interest. In exemplary embodiments, the only event that must be handled by the orchestrator logic is the start notification. In exemplary embodiments, the orchestrator service event scope may be composed of a disjunction of sub-scopes. The orchestrator service delivers an event to the orchestrator logic when it matches at least one of the registered sub-scopes. The orchestrator service may deliver each event only once, even when the event matches more than one sub-scope. Creating a sub-scope to be registered with the orchestrator service requires the definition of which type of events the application control logic needs. Some examples of event types include, but are not limited to, PE failures, operator metrics, PE metrics, and operator port metrics.

In exemplary embodiments, sub-scopes can be further refined based on the different attributes of an event. For example, one attribute of an event may be a type. A sub-scope can define a filter on these attributes, such as asking for events that have a given type. Other available event attributes include, but are not limited to, application related attributes (e.g., application name) and attributes of the sub-graph of the application that the event is contained within (e.g., type of the operator that the event occurred on). This fine grained filtering is enabled by the stream graph representation maintained by the orchestrator service for all applications being managed. Filtering conditions defined on the same attribute are considered disjunctive (e.g., as asking for an event that is associated with application A or application B), while conditions defined on different attributes are considered conjunctive (e.g., as asking for an event that is associated with application A and contained within operator type filter). The orchestrator logic can register multiple sub-scopes of the same type.

Figure 5:
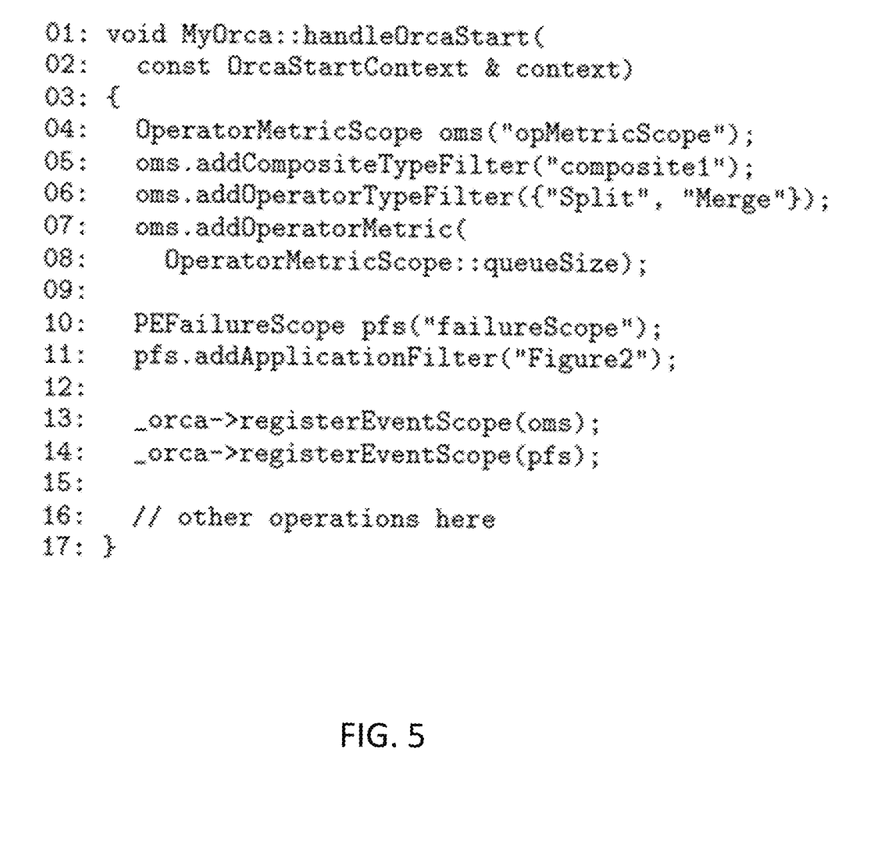
FIG. 5 is a code segment of orchestrator logic in accordance with an exemplary embodiment.

Referring now to FIG. 5 a code segment of orchestrator logic in accordance with an exemplary embodiment is shown. As shown, the orchestrator logic receives events that match two different types of sub-scopes. The first sub-scope is of type operator metric (OperatorMetricScope, line 04). It matches events related to a limited set of composites with specific type (line 05), a further limited set of operators with specific type (line 06) and related to one specific metric (lines 07-08). In exemplary embodiments, developers can specify sub-scopes by considering the application structure. For example, the invocation to addCompositeTypeFilter (line 05) results in only operators residing in a composite of type composite1 being considered for event delivery, where a composite is a reusable subgraph of a streaming applications. The invocation to addOperatorTypeFilter (line 06) leads to an additional filtering condition, which mandates only events associated with operators of type Split and Merge to be delivered. Once the orchestrator service receives the 'oms' sub-scope registration (line 13), the orchestrator logic can receive operator metric events for all metrics named queueSize from operators of type Split or Merge that are contained in any instance of a composite operator of type composite1. The second sub-scope matches PE failure events (PEFailureScope, line 10). This sub-scope only has an application filter (addApplicationFilter, line 11), so failure events affecting PEs that contain any operator in the application are delivered to the orchestrator logic.

In exemplary embodiments, the orchestrator service delivers all events matching at least one of the registered sub-scopes to the orchestrator logic. In one embodiment, events are delivered to the orchestrator logic one at a time. If other events occur while an event handling routine is under execution, these events are queued by the orchestrator service in the order they were received. For each event, the orchestrator service delivers two items to the orchestrator logic. The first item delivered is an event identification, which includes an identification of all of the sub-scopes that match the delivered event. In exemplary embodiments, developers may associate a key with a sub-scope when the sub-scope is created (lines 04 and 11 in FIG. 5). The second item delivered is an event context, which contains runtime information relating to the streaming application in which the event occurred. In exemplary embodiments, the event context has the minimum information required to characterize each type of event. In exemplary embodiments, developers can use the event context to further query the orchestrator service and inspect the logical and physical representation of the application. The orchestrator logic can use this information to decide the appropriate adaptation, or management action, to execute.

In exemplary embodiments, the orchestrator service periodically queries the SRM infrastructure components for built-in and custom metric-related events. The query frequency may have a default value, but this frequency can be changed at any point of the execution. Since SRM's response contains all metrics associated with a set of jobs, many of them can match the current orchestrator service event scope at the same time. For each metric that matches the event scope, the orchestrator service delivers one event. To facilitate the identification of metric values that are measured in the same round (i.e., pertaining to the same SRM query response), the orchestrator service can add an epoch value to the event context. The epoch value is incremented at each SRM query and serves as a logical clock for the orchestrator logic. In exemplary embodiments, the epoch value can be used when the event handling routine needs to evaluate if multiple metrics together meet a given condition.

In exemplary embodiments, the orchestrator service delivers PE failure events to the orchestrator logic immediately after receiving a notification that such an event occurred from SAM. When SAM receives a PE crash notification (e.g., due to an uncaught exception), it identifies which orchestrator service managing the crashed PE and then informs the orchestrator service that a PE has crashed. In exemplary embodiments, the PE failure event context may include a PE id, a failure detection timestamp, and a crash reason. The orchestrator service may also add an epoch value to the PE failure event context, which allows developers to identify that different PE failure invocations are related to the same physical event. The orchestrator service may increment the epoch value based on the crash reason (e.g., host failure) and the detection timestamp.

As discussed above, SPL allows both host placement and partitioning annotations to be specified for each operator in the streaming application. Users may specify these annotations based on performance, fault tolerance, and resource requirements (e.g., operators need to run in a host that has a special hardware device). A host placement configuration indicates in which hosts operators should reside. Influencing host placement is useful when developing management policies that require different applications to run in different hosts. One such example is a policy that manages replicas of the same application. If two replicas run on the same host, a host failure results in the crash of both replicas, defeating the objective of the policy. In exemplary embodiments, the orchestrator service may include a method that changes the configuration of a given application to run only in exclusive host pools, i.e., in sets of hosts that cannot be used by any other application. When developers call this method, the orchestrator service modifies the application to update all its host pool configurations. The host pool configuration change must occur before the application is submitted, since the host pool is interpreted by the SAM component when instantiating the PEs of the submitted application. In exemplary embodiments, a partitioning configuration can be used to specify which operators should be placed in the same PE (i.e., the same operating system process). One example where changing operator partitioning can be convenient is when writing policies that involve restart of operators that are logically related. If logically related groups are not isolated into multiple PEs, the restart of one group may force the restart of other logically related groups, resulting in a cascading application restart.

A common scenario in stream processing is to compose a solution based on a set of existing streaming applications. For example, applications can consume streams or files produced by other applications. In exemplary embodiments, the orchestrator is configured to allow multiple streaming applications to be managed in the same orchestrator instance. When creating the orchestrator logic, developers can register explicit dependency relations between different streaming applications with the orchestrator service. Based on the dependency relations, the orchestrator service automatically submits streaming applications that are required by other streaming applications and automatically cancels streaming applications that are no longer in use.

To take advantage of the automatic application submission and cancellation provided by the orchestrator, developers can create application configurations. An application configuration includes, but is not limited to, a string identifier, a streaming application name, a string hash map with submission-time application parameters, a Boolean indicating if the streaming application can be automatically cancelled (i.e., the application is garbage collectable), and a float value indicating for how long a garbage collectable application should continue to run before being automatically cancelled (called the garbage collection timeout). Once an application configuration is created for each streaming application that must be submitted, developers can register a unidirectional dependency between two application configurations. In exemplary embodiments, the orchestrator service is configured to return a registration error if the registered dependency leads to the creation of a cycle. When registering a dependency, developers can also indicate an uptime requirement. This requirement informs that the submission of the dependent application must be delayed by a specific number of seconds after its dependency is fulfilled (i.e., the application it depends on is submitted).

Figure 6:
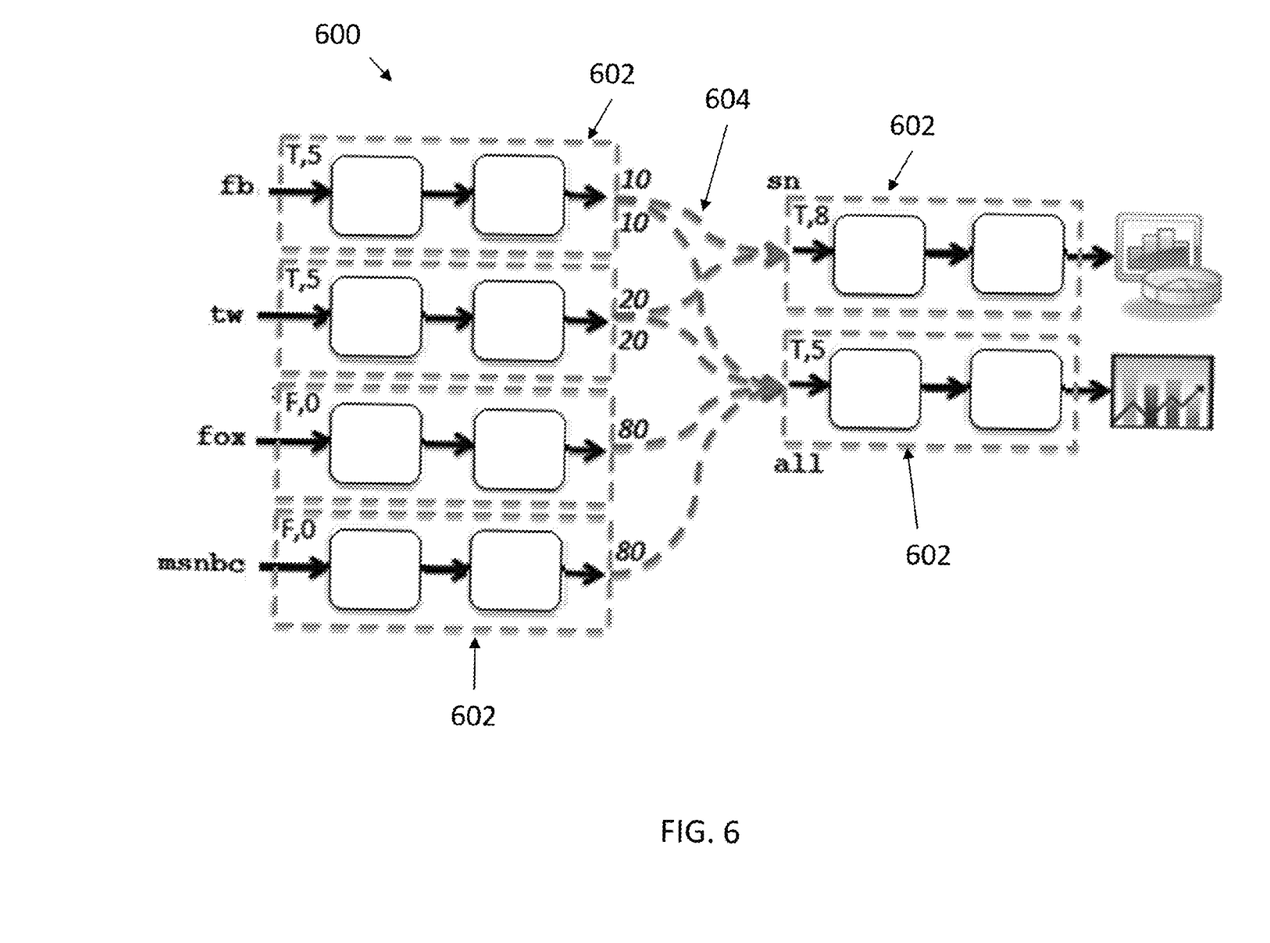
FIG. 6 is a block diagram that illustrates a dependency graph for an orchestrator managing six different streaming applications in accordance with an exemplary embodiment.

Referring now to FIG. 6, an example application dependency graph 600 for an orchestrator managing six different streaming applications 602 in accordance with an exemplary embodiment is shown. The annotation for each streaming application 602 indicates the configuration parameters of the streaming application (T for true and F for false with respect to enabling garbage collection). The dashed arrows 604 represent the established unidirectional dependency between streaming applications 602. The annotations on the dashed arrows 604 indicate the uptime requirement for each dependency. Once the dependencies are established, developers can submit requests for applications to start. When the start request is submitted, the orchestrator service starts an application submission thread, which takes a snapshot of the current application dependency graph 600 and cuts all nodes and edges that are not directly or indirectly connected to the submitted application. The orchestrator service then searches the graph 600 for all streaming applications 602 that have no dependencies (e.g., fb, tw, fox, and msnbc), and issues start requests to SAM for all applications that are not yet running.

The orchestrator service then searches the dependency graph 600 for the next target application that it must instantiate and sleeps until all uptime requirements for the target application are fulfilled. The orchestrator service chooses a streaming application 602 as the next target only when all of its dependencies are satisfied and when it has the lowest required sleeping time among all other applications with satisfied dependencies. For example, assuming that fb, tw, fox, and msnbc are all submitted at the same time, the thread sleeps for 80 seconds before submitting all. If sn was to be submitted in the same round as all, sn would be submitted first because its required sleeping time (20) is lower than all's (80). The orchestrator service delivers a job submission event to the orchestrator logic after every application submission.

In exemplary embodiments, when an application cancellation request is issued, the orchestrator service automatically cancels unused applications. First, the orchestrator service evaluates the application dependency graph to check if the cancellation request is issued to an application that is feeding another running application (e.g., cancellation request to fb).

If so, the orchestrator service returns an error code, enforcing that other applications do not starve. If not, it starts an application cancellation thread that evaluates a full snapshot of the application dependency graph to find out which applications must be cancelled. Potentially, all applications that feed the cancelled application directly or indirectly are cancelled. An application and its dependencies are not automatically cancelled when the application is not garbage collectable (i.e., false is passed as a configuration to application fox), the application is being used by other running applications (e.g., fb and tw feeding an instance of sn), or the application was explicitly submitted by the orchestrator logic. The thread cancels applications following the garbage collection timeouts. These timeouts are useful when the orchestrator logic submits another application that reuses an application enqueued for cancellation. This application is then immediately removed from the cancellation queue, avoiding an unnecessary application restart. For every cancelled application, the orchestrator service delivers a job cancellation event.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed invention.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A computer program product for providing stream processing with runtime adaptation, the computer program product comprising:
   a tangible storage device readable by a processing circuit and storing instructions for execution by the processing circuit to create an orchestrator configured to communicate with a runtime infrastructure and a stream processing application, the orchestrator configured to perform a method comprising:
   registering one or more events, wherein each of the events is associated with the stream processing application;
   monitoring, by a processor, for an occurrence of the one or more events associated with the stream processing application, wherein each of the one or more events is associated with one or more runtime metrics;
   receiving an event notification, wherein the event notification includes event identification and an event context; and
   based on receiving the event notification, executing an adaptation of the stream processing application,
   where the orchestrator includes APIs to influence a physical deployment of the stream processing application by changing a placement of operators in hosts and partitioning of operators in processing elements.

2. The computer program product of claim 1, wherein the one or more events include at least one of the one or more runtime metrics exceeding a threshold value.

3. The computer program product of claim 1, wherein the one or more events include a system failure and one or more user-defined events and wherein the stream processing application comprises:
- a plurality of operators; and
- a plurality of processing elements, wherein each of the plurality of operators is configured to reside on one of the processing elements.

4. The computer program product of claim 3, wherein the one or more runtime metrics include a built-in metric and a custom metric.

5. The computer program product of claim 4, wherein the built-in metric is a counter that maintains information common to all of the plurality of operators and all of the plurality of processing elements.

6. The computer program product of claim 1, wherein the adaptation of the stream processing application includes changing a sampling rate of the stream processing application.

7. The computer program product of claim 1, wherein the stream processing application comprises:
- a plurality of operators; and
- a plurality of processing elements, wherein each of the plurality of operators is configured to reside on one of the processing elements.

8. The computer program product of claim 7, wherein the adaptation of the stream processing application includes reassigning one or more of the processing elements to different hosts.

9. The computer program product of claim 1, wherein the event context includes runtime information relating to the stream processing application.

10. A system for providing stream processing with runtime adaptation, comprising:
- a stream processing application that receives an incoming data stream;
- a runtime infrastructure configured to execute the stream processing application; and
- an orchestrator configured to communicate with the runtime infrastructure and the stream processing application, the orchestrator configured to perform a method comprising:
  - receiving one or more events, wherein each of the events is associated with the stream processing application;
  - monitoring for an occurrence of the one or more events associated with the stream processing application, wherein each of the one or more events is associated with one or more runtime metrics that are associated with the runtime infrastructure;
  - receiving an event notification, wherein the event notification includes event identification and an event context; and
  - based on receiving the event notification, executing an adaptation of the stream processing application,
  - where the orchestrator includes APIs to influence a physical deployment of the stream processing application by changing a placement of operators in hosts and partitioning of operators in processing elements.

11. The system of claim 10, wherein the one or more events include at least one of the one or more runtime metrics exceeding a threshold value.

12. The system of claim 10, wherein the one or more runtime metrics include a built-in metric and a custom metric.

13. The system, of claim 12, wherein the stream processing application comprises:
- a plurality of operators; and
- a plurality of processing elements, wherein each of the plurality of operators is configured to reside on one of the processing elements.

14. The system of claim 13, wherein the adaptation of the stream processing application includes reassigning one or more of the operators to a different processing element.

15. The system of claim 13, wherein the built-in metric is a counter that maintains information common to all of the plurality of operators and all of the plurality of processing elements.

16. The system of claim 10, wherein the adaptation of the stream processing application includes changing a sampling rate of the stream processing application.

17. The system of claim 10, wherein the event context includes runtime information relating to the stream processing application.

* * * * *